United States Patent [19]

Ross et al.

[11] Patent Number: 4,910,644
[45] Date of Patent: Mar. 20, 1990

[54] CAPACITOR ELECTROLYTE AND PROCESS THEREFOR

[75] Inventors: Sidney D. Ross, Williamstown; Shirley A. Hart, Adams, both of Mass.

[73] Assignee: Sprague Electric Company, North Adams, Mass.

[21] Appl. No.: 380,406

[22] Filed: Jul. 17, 1989

[51] Int. Cl.[4] .............................................. H01G 9/00
[52] U.S. Cl. ..................................... 361/506; 252/62.2
[58] Field of Search .................... 252/62.2; 29/570.1; 361/504–507, 525–527

[56] References Cited

U.S. PATENT DOCUMENTS

| 3,646,403 | 2/1972 | Dunkl | 361/504 |
| 4,117,531 | 9/1978 | Ross et al. | 361/433 |
| 4,399,489 | 8/1983 | Ross | 361/506 |
| 4,454,567 | 6/1984 | Ross et al. | 361/433 |
| 4,830,785 | 5/1989 | Shinozaki et al. | 361/505 X |

Primary Examiner—Donald A. Griffin

[57] ABSTRACT

An electrolytic capacitor employs an electrolyte having amic acid salts prepared in situ in the electrolyte by reacting a cyclic anhydride with ammonia or an amine in an aprotic solvent acting as an acceptor in hydrogen bonding and thereafter adding glycol.

4 Claims, 1 Drawing Sheet

CAPACITOR ELECTROLYTE AND PROCESS THEREFOR

BACKGROUND OF THE INVENTION

This invention relates to an electrolyte for electrolytic capacitors, and more particularly to an amate salt electrolyte and to a process for preparing the electrolyte salts in situ in the electrolyte solution used in the capacitors.

A prior art electrolyte system containing a solute of an ammonium or amine salt of an amic acid or amate was described by Ross et al in U.S. Pat. No. 4,117,531 issued Sept. 26, 1978. The amic acids and their salts were prepared by reacting the anhydride with ammonia or amines in ether. Reaction of the cyclic anhydrides, e.g. succinic, maleic, phthalic or hexahydro phthalic anhydride, with ammonia or a primary or secondary amine lead to formation of succinamic acid, maleamic acid and phthalamic acid, respectively. Reaction of these "amic" acids with a second equivalent of ammonia or with a primary or secondary or tertiary amine produces the amate salts. The resulting isolated salts and amic acids were used in formulating electrolytes in the conventional solvents used in capacitor electrolytes. The resulting electrolytes were suitable for use in capacitors at low and intermediate voltages up to 200 V.

Another prior art electrolyte system was described by Ross et al in U.S. Pat. No. 4,454,567 issued June 12, 1984 wherein the solvent was a mixture of an aprotic solvent and glycol. The preferred aprotic solvents were N-methylpyrrolidinone (NMP) and γ-butyrolactone (BLO), both capable of acting as acceptors in hydrogen bonding, but not as donors. Whereas glycol can function as both acceptor and donor in hydrogen bonding.

SUMMARY OF THE INVENTION

An object of this invention is the production of electrolytes for electrolytic capacitors which are capable of operating at voltages in excess of 200 volts DC.

Another object of this invention is the production of electrolytes for electrolytic capacitors wherein amate salt solutes are prepared at exactly the required concentrations and in very high yields in the actual electrolyte solutions employed in the capacitors.

In accordance with this invention an electrolyte for an electrolytic capacitor is produced by reacting a cyclic anhydride with ammonia or an amine in an aprotic solvent to form an amate salt solute and thereafter adding glycol to effect solubilization.

The amate salt solutes of this invention are prepared in the actual electrolyte solution at exactly the required concentration and in very high yields, yields approaching 100%. As an additional advantage these results are attained with inexpensive readily available starting materials: the anhydrides, ammonia, and amines.

Success in these reactions to form the amate salt is heavily dependent on a proper choice of solvents. A suitable solvent for the anhydride reactions with ammonia or the amines of this invention must be aprotic and both non-nucleophilic and non-electrophilic and essentially inert. Diethylether meets these specifications, and it was used in our earlier work in preparing the amic acids and the amate salts; but, ether is not a suitable electrolyte solvent for capacitors. Glycol is a suitable electrolyte solvent, but glycol would not function as an inert medium for the reaction of anhydrides with ammonia and amines and would compete in the reactions of the anhydrides.

Fortunately, three known capacitors solvents, N,N-dimethylformamide (DMF), γ-butyrolactone (BLO), N-methylpyrrolidinone (NMP), are all suitable both as capacitor electrolyte solvents and as media for the reactions of cyclic anhydrides with ammonia and amines. It is possible to run the reactions of this invention in one of the above three solvents and then add whatever other ingredients may be needed to form a suitable capacitor electrolyte. For this strategy to work the reactions must go cleanly and very nearly quantitatively, as is established by the Examples set forth below.

DESCRIPTION OF THE PREFERRED EMBODIMENTS

Figure 1:
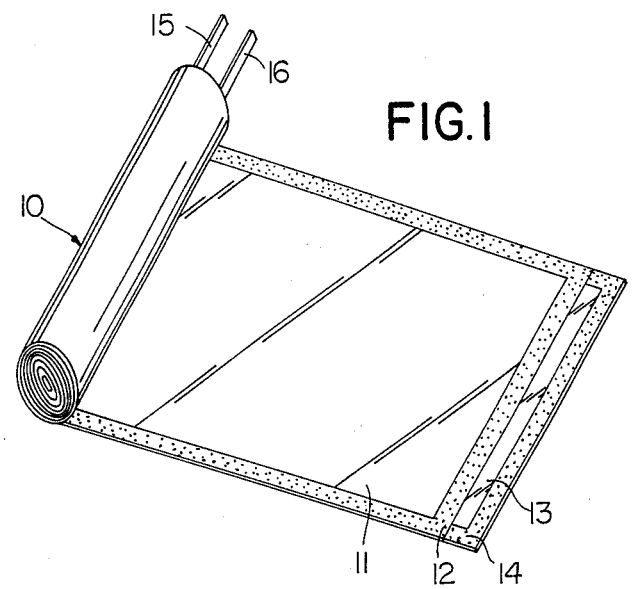
FIG. 1 shows a capacitor section partially unrolled to show the electrodes and spacers.

FIG. 1 shows an electrolytic capacitor section 10 having an anode foil electrode 11 of a valve metal, preferably aluminum. Foil 11 bears a layer of oxide on its surface, which oxide is the dielectric of the capacitor. A cathode foil electrode 13 is also preferably of valve metal. Foils 11 and 13 are separated by and contiguously wound with cellulosic spacers 12 and 14. Electrode tabs 15 and 16 are attached to anode foil 11 and cathode foil 13, respectively. Tabs 15 and 16 may extend from the same side of the section as shown in FIG. 1 or from opposite sides as shown in FIG. 2.

Figure 2:
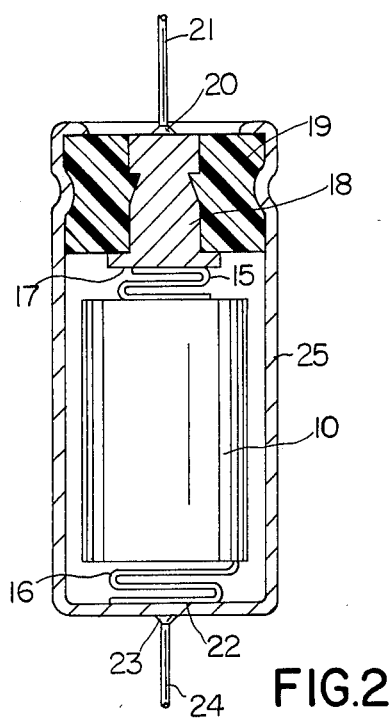
FIG. 2 is a cross-section of a finished capacitor employing the capacitor section of FIG. 1.

FIG. 2 shows a rolled section 10 which is housed in a metal casing 25 in the form of a can, preferably of aluminum. Tab 15 is connected at 17 by a weld to the bottom of metal terminal insert 18 which passes through elastomeric bung 19. External anode lead 21 is attached to the exterior top surface of insert 18 via weld 20.

Similarly, tab 16 is attached to the interior bottom of can 25 at 22, and exterior cathode lead 24 is attached to the outside bottom of can 25 via weld 23. Section 10 is impregnated with the electrolyte of this invention.

Spacers 12 and 14 are typically Manila or Benares or Kraft papers and are wound with the foils 11 and 13 to form a tightly wound cylindrical section 10. Normally, section 10 is wound dry and then impregnated with the electrolyte; although wet winding with saturated spacers 12 and 14 is acceptable capacitor practice.

Examples of electrolytes of this invention and processes for their preparation are recited below.

In preparing these electrolytes the order in which the reagents are added is important. The aprotic solvent is first added to the anhydride and stirring is continued until a clear solution results. The concentrated ammonia is then added. This results in precipitation of a product, and the mixture is stirred 3–4 hours to ensure complete reaction. The glycol is then added and stirring is continued until a homogeneous solution results. The product is now the finished electrolyte.

EXAMPLE I

Succinic anhydride (10 g; 0.1 mole) was dissolved with stirring in NMP (78 g. 75.95 cc). Conc. ammonium hydroxide (13.33 cc 12.0 g.) was added, and the mixture was stirred 4 hours at room temperature. Since conc. ammonium hydroxide is 15 molar, the amount of ammonia added above represents 0.20 mole or two equivalents per equivalent of succinic anhydride, i.e. just the right amount to convert the succinic anhydride quantitatively to ammonium succinamate. During the four hours of stirring the ammonium succinamate precipitated. Glycol (50 g; 44.82 ml.) was added, and stirring was continued until a homogeneous solution resulted.

This final solution is a suitable electrolyte having a resistivity of 600 ohm-cm at 25° and Vmax at 80° of 345 V. The composition of this electrolyte as well as two other closely related electrolytes are shown in Table I.

TABLE I

Electrolytes with Ammonium Succinamate as Solute and NMP-Glycol as Solvent

| COMPOSTION % by wt. | I-1 | I-2 | I-3 |
|---|---|---|---|
| Succinic Anhydride | 3.34 | 6.67 | 2.00 |
| NMP | 59.33 | 52.00 | 62.30 |
| Conc. NH₄OH | 4.00 | 8.00 | 2.40 |
| Glycol | 33.33 | 33.33 | 33.30 |
| Ohm-cm at 25° | 890 | 600 | 1164 |
| Vmax at 85° | 465 | 345 | 500 |

To demonstrate that the reactions involved above are, in fact, clean and very nearly quantitative as claimed, the experiments described below were carried out. Succinic anhydride (10 g.; 0.1 mole) was dissolved with magnetic stirring in NMP (100 ml.). Conc. ammonium hydroxide (15 ml; 0.225 mole) was added dropwise with stirring. After the addition, the stirring was continued for 3 hours, and the product precipitated during this period. The mixture was cooled, stirring was continued, and ether (100 ml.) was added dropwise. This was done to ensure complete precipitation of the product. The reaction was refrigerated overnight and on filtration yields 13.4 g (100% yield) of ammonium succinamate; m.p., 112°–120°. A sample recrystallized from methanol had m.p., 108°–118°. Anal: for ammonium succinate $C_4H_{10}N_2O_3$: calc. N, 20.88%; found N, 20.38%, 20.30%.

As a further check on the identity of the above product 2. of the salt was dissolved in 5 ml. of water. The solution was acidified with a little concentrated sulfuric acid and cooled. It yielded 1.36 g (78%) of succinamic acid; m.p. 152°–155°. Succinamic acid is a known compound, and a mixed melting point between an authentic sample (m.p. 155°–158°) and the above sample gave a mixed melting point of 155°–158°.

EXAMPLE II

To explore the possibility that BLO as a solvent might be preferable to NMP in higher voltage applications we duplicated the electrolytes I-2 an I-3 in Table I, replacing the NMP in these electrolytes with BLO and leaving everything else unchanged. Electrolyte II-2 in Table II is to be compared with the electrolyte I-2 in Table I. In this case the change to BLO decreases the resistivity by 36%. Nevertheless, Vmax increases from 345 V to 360 V. Electrolyte II-3 in Table II is to be compared to electrolyte I-3 in Table I. In this instance the substitution of NMP by BLO reduces the resistivity by 26%, yet Vmax increases from 500 V to 540 V.

TABLE II

Electrolytes with Ammonium Succinamate as Solute and BLO-Glycol as Solvent

| COMPOSITION % by wt. | II-2 | II-3 |
|---|---|---|
| Succinic Anhydride | 6.67 | 2.0 |
| BLO | 52.00 | 62.3 |
| Conc. NH₄OH | 8.00 | 2.4 |
| Glycol | 33.33 | 33.3 |
| Ohm-cm at 25° | 383 | 861 |
| Vmax at 85° | 360 | 540 |

The procedures and methodology described above are not confined to the use of succinic anhydride as the anhydride, to the use of ammonia as the nucleophile and to the use of NMP-glycol mixtures as the solvent system.

EXAMPLE III

An electrolyte example III-1 is provided in which succinamide has been replaced by phthalic anhydride. Also an example III-2 is provided of an electrolyte in which ammonium hydroxide has been replaced by t-butylamine, and the NMP solvent has been replaced by BLO. When ammonium hydroxide is used, this reagent provides both ammonia and water. When an anhydrous amine is used as the nucleophile, water must be added as a component of the electrolyte.

TABLE III

| COMPOSITION | % by wt. |
|---|---|
| Electrolyte III-1 | |
| Phthalic Anhydride | 3.70 |
| NMP | 43.30 |
| Conc. NH₄OH | 3.00 |
| Glycol | 50.00 |
| Ohm-cm at 25° | 957 |
| Vmax at 85° | 240 |
| Electrolyte III-2 | |
| Succinic Anhydride | 3.33 |
| BLO | 56.46 |
| t-Butylamine | 4.88 |
| Water | 2.00 |
| Glycol | 33.33 |
| Ohm-cm at 25° | 734 |
| Vmax at 85° | 290 |

EXAMPLE IV

In a final pair of examples, electrolytes IV-1 and IV-2, maleic anhydride has replaced succinic anhydride and BLO has again replaced NMP. The compositions are shown in Table IV.

TABLE IV

Electrolytes with Ammonium Maleamate as Solute and BLO-Glycol as Solvent

| COMPOSITION % by wt. | IV-1 | IV-2 |
|---|---|---|
| Maleic Anhydride | 1.96 | 1.18 |
| BLO | 62.31 | 77.38 |
| Conc. NH₄OH | 2.40 | 1.44 |
| Glycol | 33.33 | 20.00 |
| Ohm-cm at 25° | 670 | 989 |
| Vmax at 85° | 415 | 460 |

Finally we note that in all of the electrolytes which we have described above the solvent is a mixture, consisting of either NMP and glycol or BLO and glycol. Both NMP and BLO are aprotic solvents, capable of functioning as acceptors in hydrogen-bonding but not as donors. Glycol, on the other hand, can function as both acceptor and donor in hydrogen bonding.

We claim:

1. An electrolytic capacitor comprising separated electrodes, at least one of said electrodes bearing a dielectric oxide, an electrolyte bridging the separation between said electrodes, said electrolyte being an in situ produced amate salt solute dissolved in a mixed solvent of an aprotic solvent which is an acceptor in hydrogen bonding and glycol.

2. A process for preparing a capacitor electrolyte comprising reacting a cyclic anhydride with a member selected from ammonia and an amine in an aprotic solvent acting as an acceptor in hydrogen bonding to form an amate salt solute, and then adding glycol to effect solubilization of said amate.

3. The process of claim 2 wherein said cyclic anhydride is selected from the group of succinic anhydride, maleic anhydride, and phthalic anhydride.

4. The process of claim 2 wherein said aprotic solvent is selected from the group of N,N-dimethylformamide, γ-butyrolactone, and N-methylpyrrolidinone.

* * * * *